(12) United States Patent
Wu

(10) Patent No.: US 9,277,449 B2
(45) Date of Patent: Mar. 1, 2016

(54) METHOD OF LOAD BALANCING AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 198 days.

(21) Appl. No.: 13/088,439

(22) Filed: Apr. 18, 2011

(65) Prior Publication Data

US 2011/0255406 A1    Oct. 20, 2011

Related U.S. Application Data

(60) Provisional application No. 61/325,387, filed on Apr. 19, 2010.

(51) Int. Cl.
*H04W 28/08* (2009.01)
*H04W 76/02* (2009.01)

(52) U.S. Cl.
CPC .......... *H04W 28/08* (2013.01); *H04W 76/025* (2013.01)

(58) Field of Classification Search
CPC .............................. H04L 12/26; H04W 28/08
USPC ................ 370/331, 352; 455/445, 436, 435.1
See application file for complete search history.

(56) References Cited

U.S. PATENT DOCUMENTS

| 2004/0147266 | A1* | 7/2004 | Hwang et al. | 455/445 |
|---|---|---|---|---|
| 2009/0238143 | A1* | 9/2009 | Mukherjee et al. | 370/331 |
| 2009/0247165 | A1 | 10/2009 | Chen | |
| 2010/0098023 | A1* | 4/2010 | Aghili et al. | 370/331 |
| 2010/0220680 | A1* | 9/2010 | Ramankutty et al. | 370/329 |
| 2010/0222058 | A1* | 9/2010 | Pudney et al. | 455/435.2 |
| 2010/0316000 | A1* | 12/2010 | Burbidge et al. | 370/328 |
| 2010/0317347 | A1* | 12/2010 | Burbidge et al. | 455/436 |
| 2011/0002268 | A1* | 1/2011 | Dwyer et al. | 370/328 |
| 2011/0014912 | A1* | 1/2011 | Ahluwalia et al. | 455/435.1 |
| 2011/0038372 | A1* | 2/2011 | Wijayanathan et al. | 370/389 |
| 2011/0110302 | A1* | 5/2011 | Faurie et al. | 370/328 |
| 2012/0014381 | A1* | 1/2012 | Dwyer et al. | 370/352 |
| 2012/0034923 | A1* | 2/2012 | Nakai | 455/438 |

FOREIGN PATENT DOCUMENTS

| EP | 2053781 A1 | 4/2009 |
|---|---|---|
| WO | 2008022519 A1 | 2/2008 |

OTHER PUBLICATIONS

European patent application No. 11003300.8, European Search Report mailing date:Jul. 18, 2011.
3GPP TS 23.271 V9.4.0 (Jun. 2010) Technical Specification 3rd Generation Partnership Project; Technical Specification Group Services and System Aspects; Functional stage 2 description of Location Services (LCS) (Release 9).

(Continued)

*Primary Examiner* — Parth Patel
(74) *Attorney, Agent, or Firm* — Winston Hsu; Scott Margo

(57) ABSTRACT

A method of load balancing for a first network in a wireless communication system is disclosed. The method comprises receiving a radio resource control (RRC) connection request message from a mobile device, wherein the RRC message includes a specific cause; and not redirecting the mobile device to a second network according to the CS establishment cause.

4 Claims, 5 Drawing Sheets

(56) References Cited

OTHER PUBLICATIONS

3GPP TS 24.008 V8.3.0 (Sep. 2008) Technical Specification 3rd Generation Partnership Project; Technical Specification Group Core Network and Terminals; Mobile radio interface Layer 3 specification; Core network protocols; Stage 3 (Release 8).

Office action mailed on Jul. 3, 2013 for the China application No. 201110097975.7, filing date Apr. 19, 2011, p. 1-6.

* cited by examiner

METHOD OF LOAD BALANCING AND RELATED COMMUNICATION DEVICE

CROSS REFERENCE TO RELATED APPLICATIONS

This application claims the benefit of U.S. Provisional Application No. 61/325,387 filed on Apr. 19, 2010 and entitled "Method and Apparatus for load balancing in connection establishment in a wireless communication system", the contents of which are incorporated herein.

BACKGROUND OF THE INVENTION

1. Field of the Invention

The application relates to a method used in a wireless communication system and related communication device, and more particularly, to a method for load balancing in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

LTE technology supports packet based services only. However 3GPP does specify fallback for circuit switched (CS) services as well. To achieve this, LTE architecture and network nodes require additional functionality. CS Fallback defines a mechanism for using a CS legacy network (e.g. Global System for Mobile communications (GSM) or Universal Mobile Telecommunications System (UMTS)) to provide voice services along side of an LTE network. CS fallback provides voice and traditional CS-domain services (e.g. voice call, video call, short message service (SMS), Unstructured Supplementary Service Data (USSD), supplementary service). To provide these CS services, LTE reuses CS infrastructure when the UE is served by E-UTRAN.

A UE with multi-modes supports multiple radio access technologies (RATs), such as GSM, UMTS, and LTE systems. A connection established in LTE can be handover to GSM or UMTS system and vice versa. Since the LTE system supports packet based services only, the aforementioned CS services in the GSM or UMTS systems are not supported in the LTE system. To make the CS services available to UEs camped on the LTE network, a CS fallback procedure is designed. When the UE initiates a CS service or receives a paging of the CS services in the LTE system, the UE is forced to connect to the GSM or UMTS system using "inter-RAT handover to GSM or UMTS", "cell change order (CCO) to GSM or UMTS", or "RRC connection release with redirection to GSM or UTMS". The "inter-RAT handover", "CCO" and "RRC connection release" procedures are specified in 3GPP TS 36.331 v9.1.0.

The UE in radio resource control (RRC) connected mode performs PS data transmission and reception (e.g. ftp) in LTE network. The UE initiates a CS call or a Mobile Originated Location Request (MO-LR) by using CS fallback procedure. The network sends a RRC connection release message or a Mobility from EUTRA message to redirect the UE to UTRAN. When the UE camps on UTRAN, the UE initiates a RRC connection procedure. The UE performs random access and transmits a RRC Connection Request message including establishment cause "Originating Background Call", triggered by PS data transmission (e.g. ftp) to the UTRAN. However, the UTRAN is designed to redirect UEs supporting LTE to the network for PS services for load balancing so the UTRAN redirects the UE to the LTE network. Therefore the UE fails to initiate the CS call. If the UE tries again, the UE is redirected back and forth between the UTRAN and LTE network.

SUMMARY OF THE INVENTION

A method of load balancing for a network in a wireless communication system and a related communication device are provided.

A method of load balancing for a first network in a wireless communication system is disclosed. The method comprises receiving a radio resource control (RRC) connection request message from a mobile device, wherein the RRC message includes a specific cause; and not redirecting the mobile device to a second network according to the specific cause.

A method of load balancing for a mobile device in a wireless communication system is disclosed. The method comprises including a circuit-switched (CS) establishment cause in a radio resource control (RRC) connection request message when having a CS service and a packet-switched (PS) service; and sending the RRC connection request message to a network for RRC connection establishment.

A method of loading balancing for a mobile device in a wireless communication system is disclosed. The method comprises moving from a first network to a second network; and including a cause in a radio resource control (RRC) message according to mobility of the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
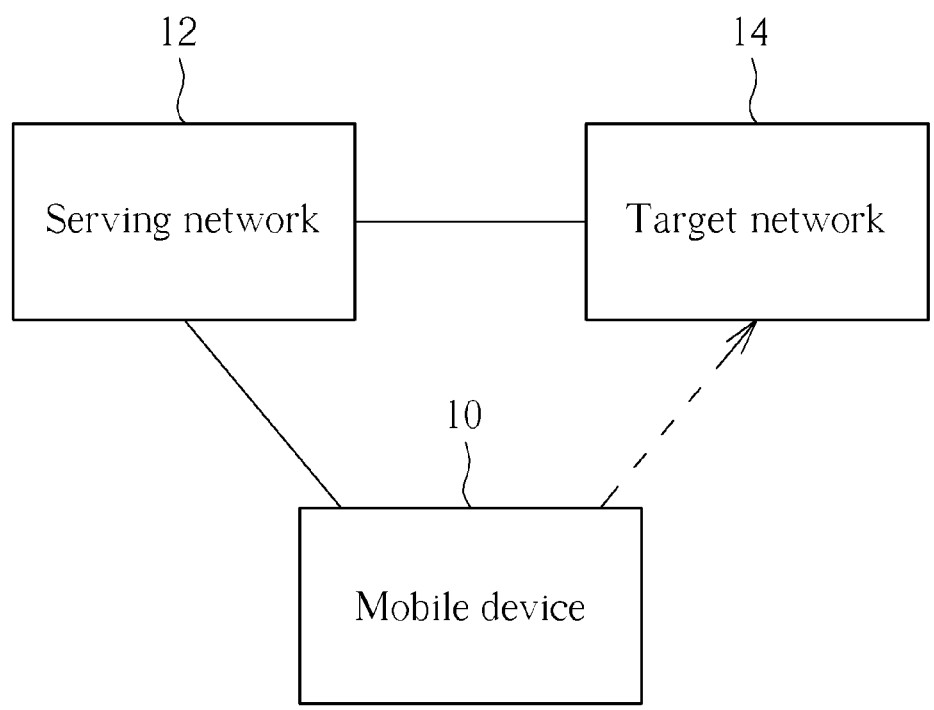
FIG. 1 is a schematic diagram of an exemplary wireless communication system.

Please refer to FIG. 1, which simply illustrates an exemplary wireless communication system 10. In FIG. 1, a serving network 12 and a target network 14 employ different radio access technologies (RATs), and the mobile device supporting both of the RATs is served by the serving network 12. The serving network 12 supports a single service domain and may be referred as to a LTE (long-term evolution) or a HSPA+ (High Speed Packet Access Plus) system network only supporting a PS (Packet Switched) service domain. The target network 14 supports multiple service domains and may be referred as to a network of a UMTS (Universal Mobile Telecommunications System) system supporting both PS (Packet Switched) and CS (Circuit Switched) service domains. In the UMTS system, the network is referred as a Universal Terrestrial Radio Access Network (UTRAN) comprising a radio network controller (RNC) and a plurality of NBs (Node Bs);

In the LTE system, the network is referred as a evolved-UTRAN (E-UTRAN) comprising a plurality of eNBs (evolved-Node Bs). The mobile device is referred as to a user equipment (UEs) or a mobile station (MS) supporting the abovementioned RATs and may be a device such as a mobile phone, a computer system, etc. Besides, the networks 12 and 14 and the mobile device can be seen as a transmitter or receiver according to transmission direction, e.g., for uplink (UL), the mobile device is the transmitter and the networks 12 and 14 are the receivers, and for downlink (DL), the networks 12 and 14 are the transmitters and the mobile device is the receiver. When a subscriber intends to have CS services (e.g. voice call, video call, short message service (SMS), Unstructured Supplementary Service Data (USSD), supplementary service), the mobile device makes a service request to the serving network 12, performing CS fallback to redirect the UE to the target network 14. To provide these services, CS fallback allows the serving network 12 reuses CS infrastructure of the target network 14 when the mobile device is served by the serving network 12.

Figure 2:
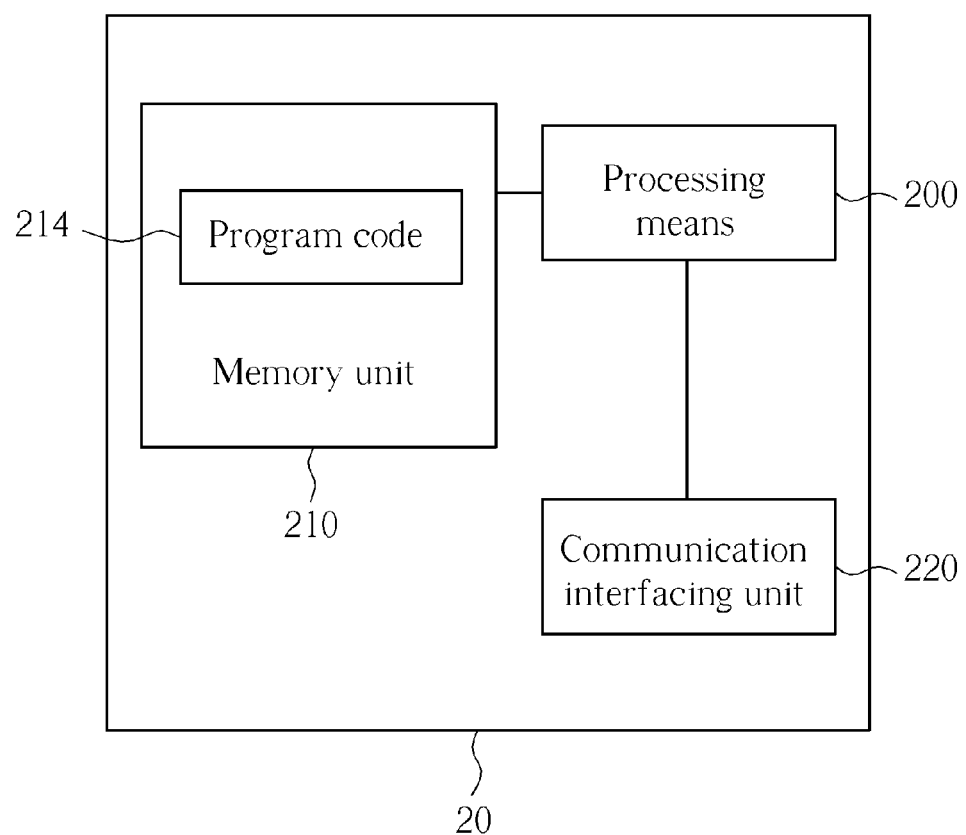
FIG. 2 is a schematic diagram of an exemplary communication device.

Please refer to FIG. 2. FIG. 2 is a schematic diagram of an exemplary communication device 20. The communication device 20 can be the mobile device or the networks 14 or 12 shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
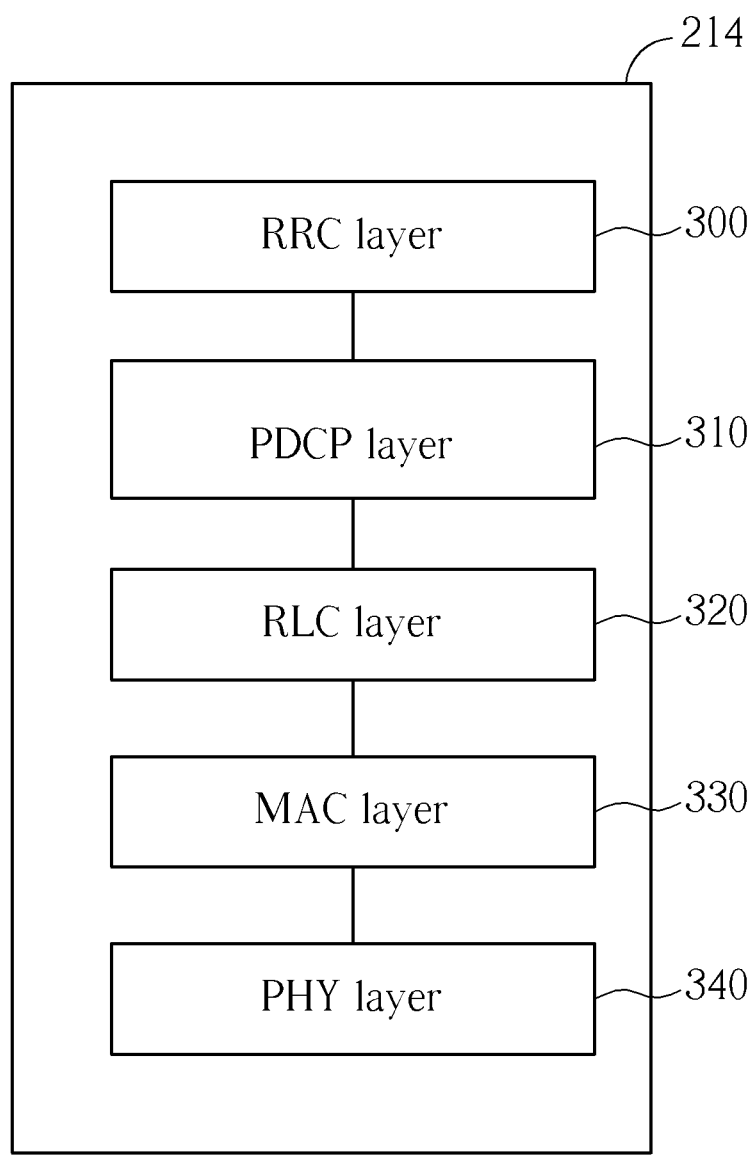
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

Figure 4:
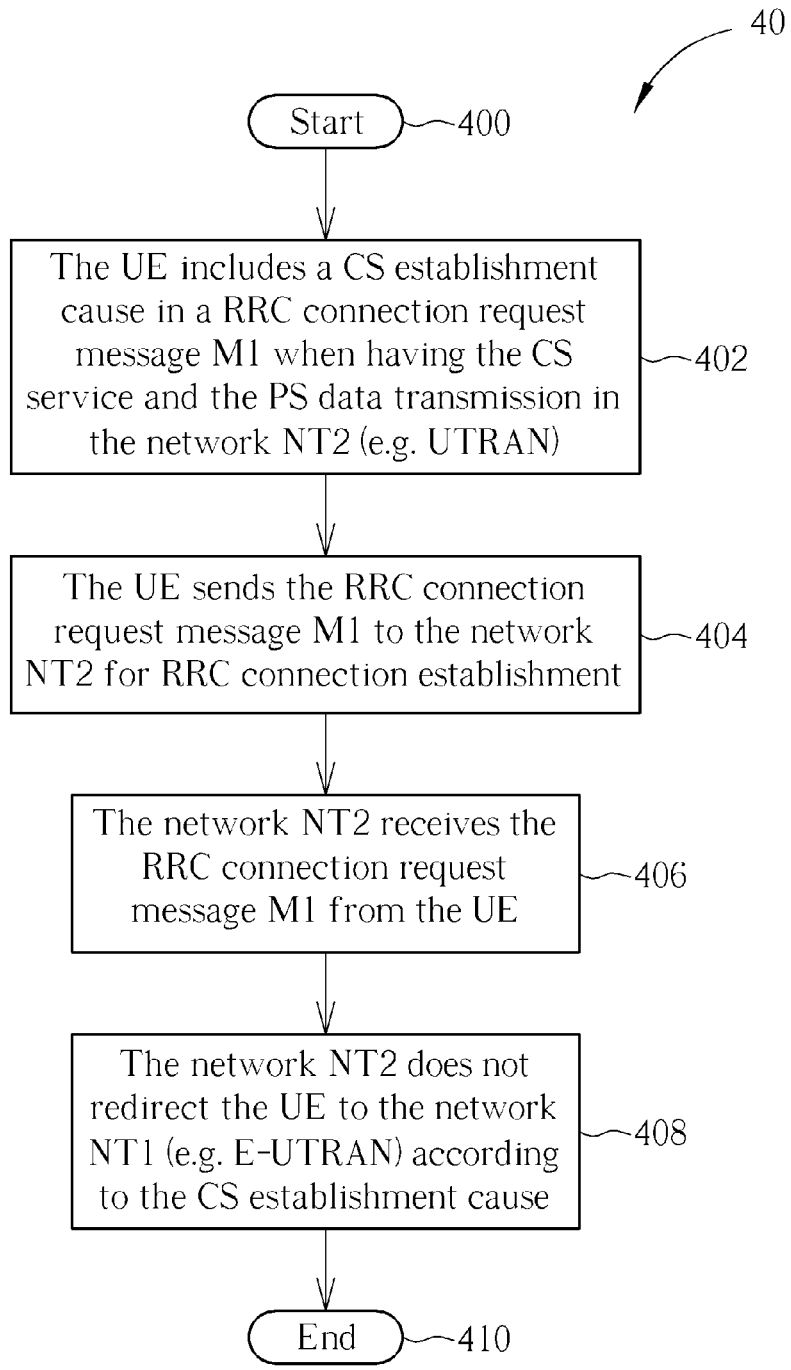
FIG. 4 is a flow chart of an exemplary process.

Please refer to FIG. 4, which is a flow chart of an exemplary process 40. The process 40 is used for load balancing for a wireless communication system. The wireless communication system could be the wireless communication system 10 and include a UE, networks NT1 and NT2. The network NT1 could be the serving network 12. The UE was having a PS data transmission (e.g. ftp) in the network NT1 and initiating a CS service via a CS fallback procedure. The UE received a RRC connection release message or a Mobility from EUTRA message to redirect the UE to a current network NT2. The network NT2 could be the target network 14 in the wireless communication system 10, which supports both of CS domain and PS domain. The UE camps on the network NT2 and initiates a RRC connection procedure for the CS service. The process 40 can be compiled into the program code 214 and include the following steps:

Step 400: Start.

Step 402: The UE includes a CS establishment cause in a RRC connection request message M1 when having the CS service and the PS data transmission in the network NT2 (e.g. UTRAN).

Step 404: The UE sends the RRC connection request message M1 to the network NT2 for RRC connection establishment.

Step 406: The network NT2 receives the RRC connection request message M1 from the UE.

Step 408: The network NT2 does not redirect the UE to the network NT1 (e.g. E-UTRAN) according to the CS establishment cause.

Step 410: End.

According to the process 40, when the UE which has been having the PS data transmission initiates the RRC connection procedure for the CS service in the network NT2, the UE includes the CS establishment cause in the RRC connection request message M1. The CS service may include a voice call, video call, short message service (SMS), Unstructured Supplementary Service Data (USSD), supplementary service. The PS data transmission is initiated or ongoing. The UE sends the RRC connection request message M1 to the network NT2 for RRC connection establishment. The network NT2 receives the RRC connection request message M1 from the UE. According to the CS establishment cause, the network NT2 does not redirect the UE the network NT1. In other words, the UE perform RRC connection establishment with the network NT2 instead of redirecting the UE to the network NT1 when the CS establishment cause is found in the RRC connection message M1. Thus, the UE is not redirected back and forth between the network NT1 and the network NT2.

In some examples, the network NT2 may receive a RRC connection request message M2 from the UE. The RRC connection request message M2 does not include the CS establishment cause. Instead, the RRC connection request message M2 may include a PS establishment cause. In this situation, the network NT2 redirects the UE to the network NT1 according to the PS establishment cause.

Figure 5:
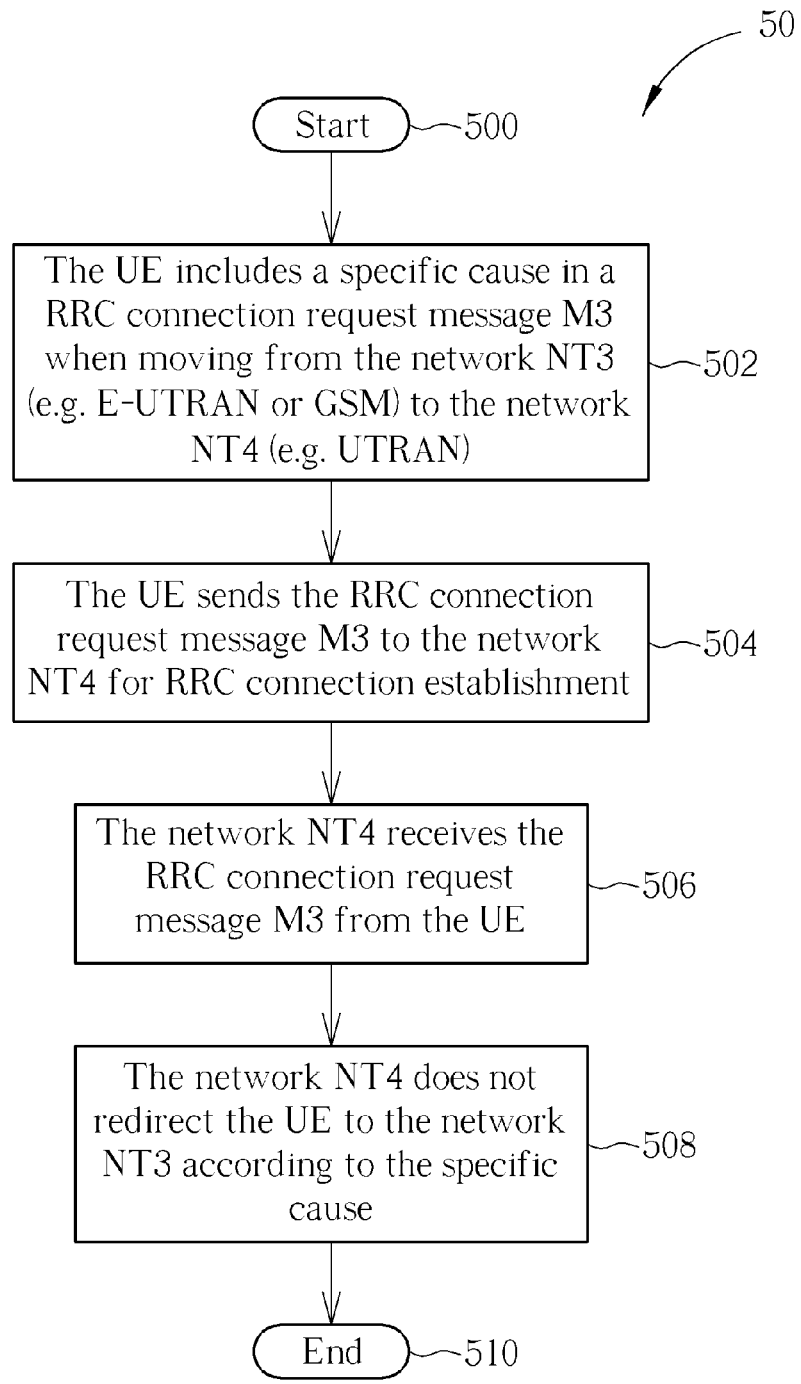
FIG. 5 is a flow chart of an exemplary process.

Please refer to FIG. 5, which is a flow chart of another exemplary process 50. The process 50 is used for load balancing for a wireless communication system. The wireless communication system could be the wireless communication system 10 and include a UE, networks NT3 and NT4. The network NT3 could be the serving network 12 or a GSM (Global System for Mobile communications) network. A UE was having a PS data transmission (e.g. ftp) in the network NT3 and initiating a CS service via a CS fallback procedure. The UE received a RRC connection release message or a Mobility from EUTRA message to redirect the UE to a current network NT4. The network NT3 could be the target network 14 in the wireless communication system 10, which supports both of CS domain and PS domain. The UE camps on the network NT4 and initiates a RRC connection procedure for the CS service. The process 50 can be compiled into the program code 214 and include the following steps:

Step 500: Start.

Step 502: The UE includes a specific cause in a RRC connection request message M3 when moving from the network NT3 (e.g. E-UTRAN or GSM) to the network NT4 (e.g. UTRAN).

Step 504: The UE sends the RRC connection request message M3 to the network NT4 for RRC connection establishment.

Step 506: The network NT4 receives the RRC connection request message M3 from the UE.

Step 508: The network NT4 does not redirect the UE to the network NT3 according to the specific cause.

Step 510: End.

According to the process 50, when the UE is redirected from the network NT3 to the network NT4 the UE includes the specific cause in the RRC connection request message M3. Then, the UE send the RRC connection request message M3 to the network NT4 for RRC connection establishment. The network NT4 receives the RRC connection request message M3 from the UE. According to the specific cause, the network NT4 does not redirect the UE the network NT3. In other words, the UE perform RRC connection establishment with the network NT4 instead of redirecting the UE to the network NT3 when the specific cause is found in the RRC connection message M3. Thus, the UE is not redirected back and forth between the network NT3 and the network NT4.

Preferably, the specific cause is Inter-RAT cell changed order or designed for redirection trigged by a RRC connection release or a RRC connection reject.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handle load balancing in the wireless communications system 10.

To sum up, when the UE has both CS service and PS data transmission, the UE include a CS establishment cause in an RRC connection request message and send the RRC connection request message to UTRAN. When UTRAN receives the RRC connection request message, UTRAN does not redirect the UE to E-UTRAN according to the CS establishment cause. In another example, the UE includes a specific cause in the RRC connection request message when the UE moves from E-UTRAB/GSM to UTRAN. When UTRAN receives the RRC connection request message, UTRAN does not redirect the UE to E-UTRAN according to the specific cause. According examples of present disclosures, the UE is not redirected back and forth between E-UTRAN and UTRAN.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of load balancing for a second network in a wireless communication system, the method comprising:
   the second network receiving a first cause or a packet-switched establishment cause included in a radio resource control (RRC) connection request message from a mobile device when the mobile device is moved from a first network to the second network; and
   the second network not redirecting the mobile device back to the first network when the second network receives the first cause and redirecting the mobile device back to the first network when the second network receives the packet-switched establishment cause;
   wherein the first network is an E-UTRAN (Evolved UMTS Terrestrial Radio Access Network) and the second network is a UTRAN (UMTS Terrestrial Radio Access Network);
   wherein the first cause is a circuit-switched (CS) establishment cause, an Inter-RAT cell changed order or a value designed for redirection.

2. The method of claim 1 further comprising performing the RRC connection establishment with the mobile device.

3. A wireless communication system, comprising:
   an Evolved UMTS Terrestrial Radio Access Network (E-UTRAN); and
   a UMTS Terrestrial Radio Access Network (UTRAN), wherein the UTRAN performs a method of load balancing, and the method comprises:
      the UTRAN receiving a first cause or a packet-switched establishment cause included in a radio resource control (RRC) connection request message from a mobile device when the mobile device is moved from the E-UTRAN to the UTRAN, wherein the first cause is a circuit-switched (CS) establishment cause, an Inter-RAT cell changed order or a value designed for redirection; and
      the UTRAN not redirecting the mobile device back to the E-UTRAN when the UTRAN receives the first cause and the UTRAN redirecting the mobile device back to the E-UTRAN when the UTRAN receives the packet-switched establishment cause.

4. The wireless communication system of claim 3, wherein the method further comprises performing the RRC connection establishment with the mobile device.

* * * * *